US012242712B2

(12) United States Patent
Desai et al.

(10) Patent No.: US 12,242,712 B2
(45) Date of Patent: Mar. 4, 2025

(54) DYNAMIC APPLICATION CONTENT ON HOME SCREEN

(71) Applicant: Apple Inc., Cupertino, CA (US)

(72) Inventors: Neil N. Desai, San Francisco, CA (US); Nahir A. Khan, San Francisco, CA (US); Andrew Brett Cato, Santa Clara, CA (US); John Louch, Boulder, CO (US); Patrick Reid Metcalfe, Santa Clara, CA (US); Antony J. Dzeryn, Round Rock, TX (US); David A. Schaefgen, San Jose, CA (US); Jacob Fraimow, San Francisco, CA (US); Nils Moshe Abraham Hayat, San Francisco, CA (US); Jacob Alan Xiao, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 133 days.

(21) Appl. No.: 17/351,221

(22) Filed: Jun. 17, 2021

(65) Prior Publication Data

US 2021/0397313 A1    Dec. 23, 2021

Related U.S. Application Data

(60) Provisional application No. 63/041,762, filed on Jun. 19, 2020.

(51) Int. Cl.
*G06F 17/00* (2019.01)
*G06F 3/0482* (2013.01)
(Continued)

(52) U.S. Cl.
CPC .......... *G06F 3/0484* (2013.01); *G06F 3/0482* (2013.01); *G06F 9/451* (2018.02)

(58) Field of Classification Search
CPC ....... G06F 3/0484; G06F 3/0482; G06F 9/451
See application file for complete search history.

(56) References Cited

U.S. PATENT DOCUMENTS 8,566,923 B2 * 10/2013 Fredette .................... G06F 8/38
                                                                  726/19
8,843,853 B1      9/2014 Smoak
(Continued)

FOREIGN PATENT DOCUMENTS

WO    WO-2017173765 A1 * 10/2017 ........... G06F 3/0481
WO    WO 2017/192327       11/2017
(Continued)

OTHER PUBLICATIONS

International Search Report and Written Opinion from PCT/US2021/037890, dated Oct. 13, 2021, 15 pages.
(Continued)

*Primary Examiner* — Laurie A Ries
(74) *Attorney, Agent, or Firm* — BAKERHOSTETLER

(57) ABSTRACT

A device implementing a system to render widget user interfaces for display of dynamic application content on a home screen includes a processor configured to identify a container associated with a first home screen, the container corresponding to an application. The processor is further configured to retrieve data describing a plurality of user interfaces, associated with respective times, of the application. The processor is further configured to render, based on the data, the plurality of the user interfaces in advance of the respective times. The processor is further configured to determine that the first home screen is currently displayed. The processor is further configured to select a first rendered user interface from the rendered user interfaces, wherein the respective time associated with the first rendered user interface corresponds to a current time. The processor is further (Continued)

configured to display the selected first rendered user interface on the first home screen.

20 Claims, 9 Drawing Sheets

(51) Int. Cl.
*G06F 3/0484* (2022.01)
*G06F 9/451* (2018.01)

(56) References Cited

U.S. PATENT DOCUMENTS

| | | | | |
|---|---|---|---|---|
| 9,152,529 | B2 * | 10/2015 | George | G06F 3/0481 |
| 9,344,522 | B2 * | 5/2016 | Maxwell | H04N 21/4788 |
| 10,346,900 | B1 | 7/2019 | Wilson et al. | |
| 10,402,035 | B1 * | 9/2019 | Jose | G06F 9/451 |
| 10,692,049 | B2 * | 6/2020 | Nalliah | G06Q 10/1093 |
| 10,698,704 | B1 * | 6/2020 | Patel | H04L 67/60 |
| 11,455,085 | B2 * | 9/2022 | Tyler | G06F 3/0488 |
| 12,131,005 | B2 * | 10/2024 | Walkin | G06F 3/04845 |
| 2005/0068311 | A1 * | 3/2005 | Fletcher | G09G 5/00 |
| | | | | 345/211 |
| 2007/0130541 | A1 | 6/2007 | Louch et al. | |
| 2010/0058248 | A1 | 3/2010 | Park | |
| 2011/0238736 | A1 | 9/2011 | Tanaka | |
| 2014/0298220 | A1 * | 10/2014 | Luu | G06F 3/04845 |
| | | | | 715/765 |
| 2015/0100890 | A1 * | 4/2015 | Kosmiskas | G06F 8/61 |
| | | | | 715/744 |
| 2016/0179813 | A1 * | 6/2016 | Su | G06F 16/24578 |
| | | | | 707/728 |
| 2016/0224198 | A1 * | 8/2016 | Yoon | G06F 3/0485 |
| 2017/0357495 | A1 * | 12/2017 | Crane | G06F 9/451 |
| 2020/0294000 | A1 * | 9/2020 | Sexauer | H04L 12/1818 |
| 2020/0294001 | A1 * | 9/2020 | Sexauer | G06Q 10/109 |

FOREIGN PATENT DOCUMENTS

| | | | | |
|---|---|---|---|---|
| WO | WO-2019168387 | A1 * | 9/2019 | G06F 3/0481 |
| WO | WO-2019238593 | A1 * | 12/2019 | G06F 3/0481 |
| WO | WO-2019238594 | A1 * | 12/2019 | G06F 16/9577 |

OTHER PUBLICATIONS

Extended European Search Report from European Patent Application No. 24184358.0, dated Nov. 27, 2024, 10 pages.

* cited by examiner

DYNAMIC APPLICATION CONTENT ON HOME SCREEN

CROSS REFERENCE TO RELATED APPLICATIONS

This application claims the benefit of priority to U.S. Provisional Patent Application No. 63/041,762, entitled "Dynamic Application Content On Home Screen," filed on Jun. 19, 2020, the disclosure of which is hereby incorporated herein in its entirety.

TECHNICAL FIELD

The present description relates generally to user interfaces, including methods and systems for efficient rendering of widget user interfaces for display of dynamic application content on a home screen.

BACKGROUND

Applications may provide information that is of interest to a user. However, to access that information, the user may need to launch an associated application from a shortcut displayed on a home screen, which may require time to locate the position of the application from one or more home screens, waiting for the application to launch, and navigating to a relevant section of the application that displays information of interest to the user. This process is inefficient for both user interaction time and device processing time. Accordingly, there is a need to provide streamlined access to application information in an efficient manner.

SUMMARY

The subject technology provides for methods and systems for efficient rendering of widget user interfaces for display of dynamic application content on a home screen. Home screens can be represented by a list of containers containing different content including shortcuts for launching applications or widget user interfaces of associated installed applications. The widget user interfaces may be defined using hierarchical views in a declarative syntax, wherein data for display may be retrieved from an application extension to minimize waking of the application. Widget user interfaces can be rendered in advance for future times by a background or daemon process. When a container for a widget is shown on a displayed home screen, one of the rendered user interfaces can be shown according to the current time, thereby providing a responsive user experience with low latency. Various policies for containers may be enforced with regard to rendering update timing, rendering update frequency, and rendering execution time to optimize resource usage. In this manner, widget user interfaces can be efficiently supported for display of dynamic application content on a home screen.

According to various implementations, a method for efficient rendering of widget user interfaces for display of dynamic application content on a home screen is provided. The method may include identifying, by a first device, a container associated with a first home screen, the container corresponding to an application. The method may include retrieving, by the first device, data describing a plurality of user interfaces of the application, each of the user interfaces being associated with a respective time. The method may include rendering, by the first device and based at least in part on the data, the plurality of the user interfaces in advance of the respective times associated with the user interfaces. The method may include determining, by the first device, that the first home screen is currently displayed. The method may include selecting, by the first device, a first rendered user interface from the plurality of the rendered user interfaces, wherein the respective time associated with the first rendered user interface corresponds to a current time. The method may include displaying, by the first device, the selected first rendered user interface on the currently displayed first home screen.

Other aspects include corresponding systems, apparatuses, and computer program products for implementation of the computer-implemented method.

Further aspects of the subject technology, features, and advantages, as well as the structure and operation of various aspects of the subject technology are described in detail below with reference to accompanying drawings.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

To provide information from installed applications that can be viewed at a glance, operating systems may support the installation of applications that are displayed on a home screen, also referred to as a widget. Widgets may display information from an associated application without requiring the user to launch the associated application. While widgets may improve productivity and ease of use, existing systems for supporting widgets on a home screen may not be optimized for efficient implementation on mobile devices.

For example, widgets may be permitted to execute arbitrary code with unbounded update frequency and execution time, negatively impacting device battery life, performance, and responsiveness. To manage widgets in an efficient and uniform manner while providing flexible user interface layouts, widget user interfaces may be defined in containers using a declarative syntax, wherein data for display may be retrieved from an application extension to minimize waking of the application. Widget user interfaces can be rendered in advance for future display times by a background or daemon process. When a container for a widget is shown on a displayed home screen, one of the rendered user interfaces can be shown according to the current time, thereby providing a responsive user experience with low latency. Various policies for containers may be enforced with regard to update timing, update frequency, and rendering execution time to optimize resource usage.

Figure 1:
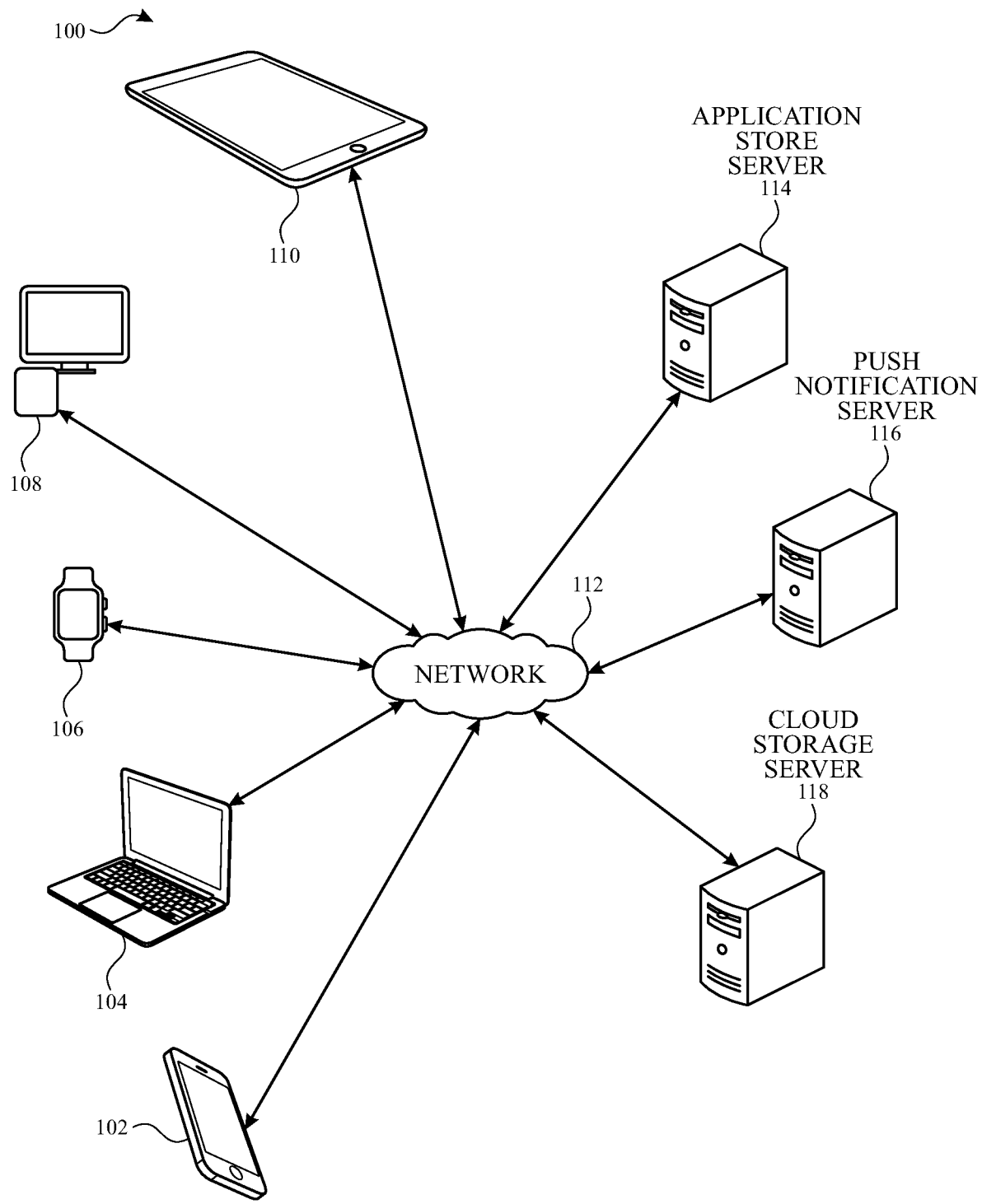
FIG. 1 illustrates an example network environment in which a system for providing efficient rendering of widget user interfaces for display of dynamic application content on a home screen may be implemented, in accordance with one or more implementations.

FIG. 1 illustrates an example network environment in which a system for providing efficient rendering of widget user interfaces for display of dynamic application content on a home screen may be implemented, in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 104, 106, 108 and 110 (hereinafter "the electronic devices 102-110"), an application store server 114, a push notification server 116 and a cloud storage server 118 (hereinafter "the servers 114-118"), and a network 112. The network 112 may communicatively (directly or indirectly) couple, for example, any two or more of the electronic devices 102-110 and the servers 114-118. In one or more implementations, the network 112 may be an interconnected network of devices that may include, and/or may be communicatively coupled to, the Internet. In one or more implementations, the network 112 may correspond to a local area network (e.g., a WiFi network) connecting one or more of the electronic devices 102-110. For explanatory purposes, the network environment 100 is illustrated in FIG. 1 as including electronic devices 102-110 and servers 114-118; however, the network environment 100 may include any number of electronic devices and any number of servers.

One or more of the electronic devices 102-110 may be, for example, a portable computing device such as a laptop computer, a smartphone, a smart speaker, a digital media player, a peripheral device (e.g., a digital camera, headphones), a tablet device, a wearable device such as a smartwatch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 102 is depicted as a smartphone, the electronic device 104 is depicted as a laptop computer, the electronic device 106 is depicted as a smartwatch, and the electronic device 110 is depicted as a tablet. By way of example, the electronic device 108 is depicted as a digital media player (e.g., configured to receive digital data such as music and/or video and stream it to a television or other video display). In one or more implementations, the electronic device 108 may be integrated into the display device.

One or more of the electronic devices 102-110 may be configured to communicate or otherwise interact with one or more of the servers 114-118. Each of the electronic devices 102-110 may be, and/or may include all or part of, the device discussed below with respect to FIG. 2, and/or the electronic system discussed below with respect to FIG. 8.

In one or more implementations, the application store server 114 may be configured to provide applications and associated widget data extensions and widget user interfaces for storage and execution on electronic devices 102-110. The electronic devices 102-110 may periodically query the application store server 114 for updated applications, widget data extensions, or widget user interfaces. Updates from application store server 114 may also be pushed to electronic devices 102-110. The push notification server 116 may be configured to receive push notifications for third party applications, which may be pushed to electronic devices 102-110 when compliant with an update policy, as described further in FIG. 3. The cloud storage server 118 may be configured to store data (e.g., files such as documents and/or photos) associated with user accounts for download on user devices, to share and/or send data to other users, and/or to back-up (e.g., wirelessly) device data.

One or more of the servers 114-118 may be, and/or may include all or part of the electronic system discussed below with respect to FIG. 8. Each of the servers 114-118 may include one or more servers, such as a cloud of servers. For explanatory purposes, a single server is shown and discussed with respect to various operations for each of the servers 114-118. However, these and other operations discussed herein may be performed by one or more servers, and each different operation may be performed by the same or different servers.

Figure 2:
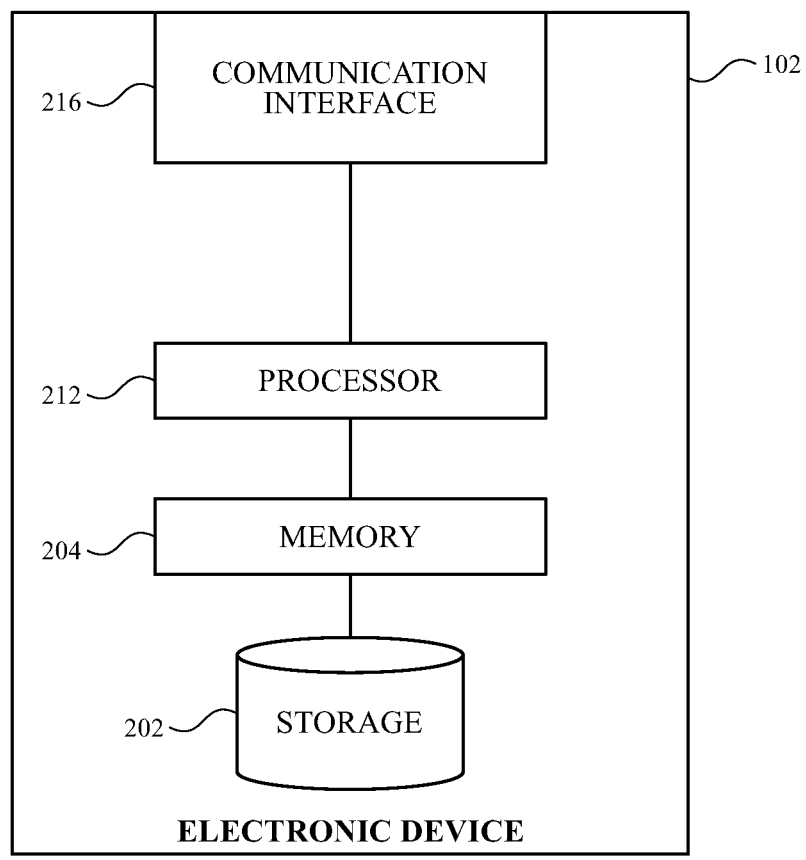
FIG. 2 illustrates a block diagram of an example electronic device, in accordance with one or more implementations.

FIG. 2 illustrates an example device that may implement a system for executing machine learning models from memory, in accordance with one or more implementations. For explanatory purposes, FIG. 2 is primarily described herein with reference to the electronic device 102 of FIG. 1. However, FIG. 2 may correspond to any of the electronic devices 102-110 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a storage 202, a memory 204, a processor 212, and a communication interface 216. The storage 202 may correspond to a first type of memory, such as a non-volatile memory, including flash storage such as NAND flash and/or magnetic storage. The memory 204 may correspond to a second type of memory, such as a volatile memory, including dynamic random-access memory (DRAM). The memory 204 may include suitable logic, circuitry, and/or code that enable storage of various types of information such as received data, generated data, code, and/or configuration information.

The processor 212 may include suitable logic, circuitry, and/or code that enable processing data and/or controlling operations of the electronic device 102. In this regard, the processor 212 may be enabled to provide control signals to various other components of the electronic device 102. The processor 212 may also control transfers of data between various portions of the electronic device 102, including storage 202 and memory 204. Additionally, the processor 212 may enable implementation of an operating system or otherwise execute code to manage operations of the electronic device 102. The processor 212 may include general purpose processors, graphics processing units (GPUs), and/or specialized processors.

In one or more implementations, the memory 204 may store one or more background processes for managing home screens, rendering widget user interfaces in timelines, and enforcing update policy. As described below with respect to FIG. 3, the background processes may generate future rendered views of widget user interfaces that are displayed on home screens.

The communication interface 216 may include suitable logic, circuitry, and/or code that enables wired or wireless communication, such as between any of the electronic devices 102-110 and one or more of the servers 114-118 over the network 112. The communication interface 206 may include, for example, one or more of a Bluetooth communication interface, a cellular interface, an NFC interface, a Zigbee communication interface, a WLAN communication interface, a USB communication interface, or generally any communication interface.

In one or more implementations, one or more of the processor 212, the storage 202, the memory 204, the communication interface 216, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
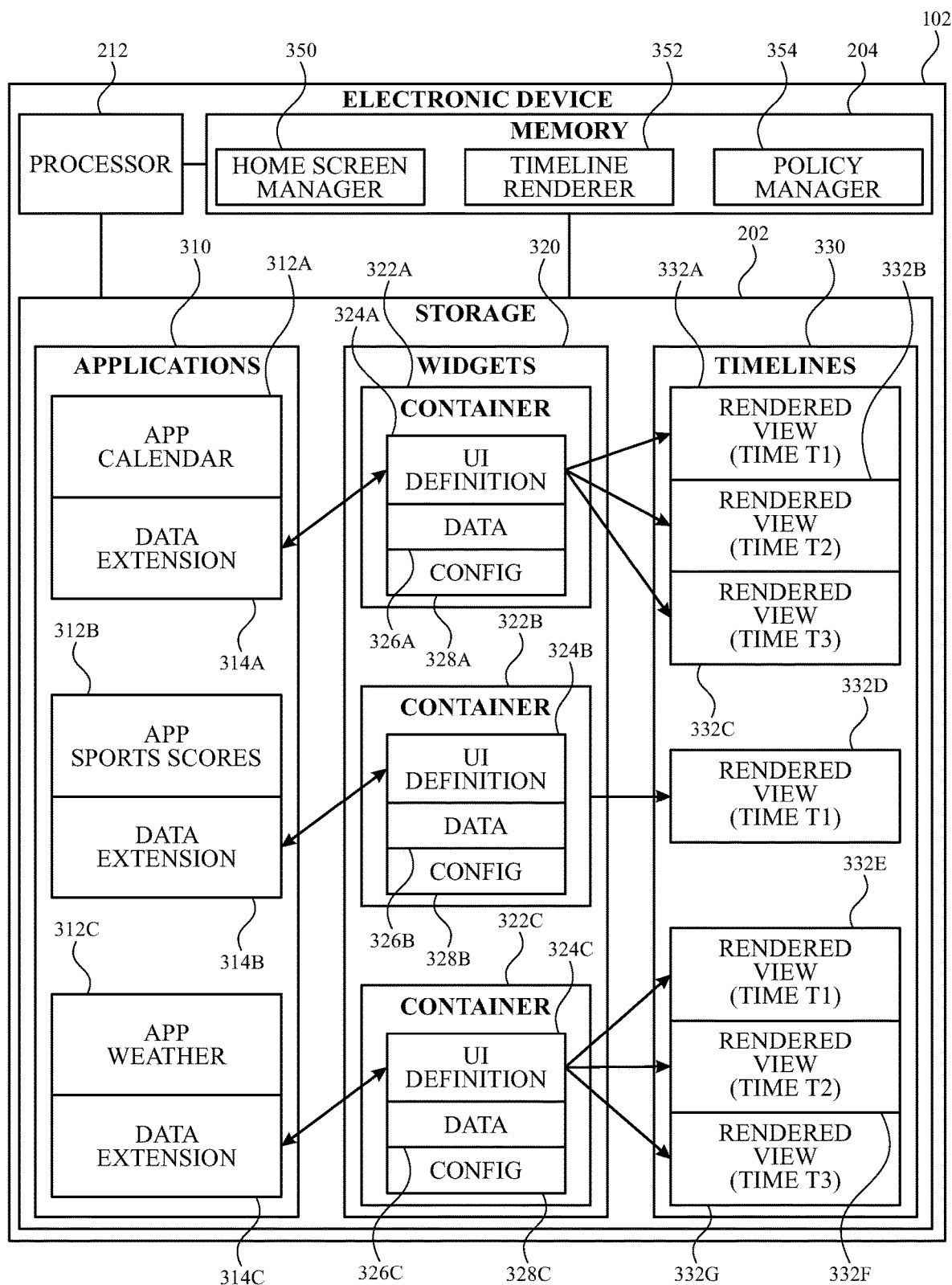
FIG. 3 illustrates a block diagram of an example electronic device executing background processes and storing applications, widgets, and rendered timelines, in accordance with one or more implementations.

FIG. 3 illustrates a block diagram of an electronic device 102 for executing background processes and storing applications 310, widgets 320, and timelines 330, in accordance with one or more implementations. As shown in FIG. 3, electronic device 102 may include storage 202, memory 204, and processor 212. Storage 202 may include applications 310, widgets 320, and timelines 330. Applications 310 may include application 312A, application 312B, application 312C, data extension 314A, data extension 314B, and data extension 314C. Widgets 320 may include container 322A, container 322B, and container 322C. Container 322A may include user interface (UI) definition 324A, data 326A, and config 328A. Container 322B may include user interface (UI) definition 324B, data 326B, and config 328B. Container 322C may include user interface (UI) definition 324C, data 326C, and config 328C. Timelines 330 may include rendered view 332A, 332B, 332C, 332D, 332E, 332F, and 332G. Memory 204 may include home screen manager 350, timeline renderer 352, and policy manager 354.

As shown in FIG. 3, a number of applications 310 may be installed on electronic device 102, including application 312A corresponding to a calendar application, application 312B corresponding to a sports scores application, and application 312C corresponding to a weather application. The applications 310 may, for example, have been previously downloaded from application store server 114. Each application 312A-312C is also provided with a respective data extension 314A-314C. The data extensions 314A-314C may be lightweight data providers for widget data that enable widget user interfaces to be updated without querying widget data directly from the associated application 312A-312C, thereby bypassing a computationally expensive waking or launching of application 312A-312C.

An associated widget user interface may be optionally provided for each of applications 310. Widgets 320 may store the associated widgets for each of applications 312A-312C in respective containers 322A-322C. For example, container 322A includes a user interface (UI) definition 324A, data 326A, and config 328A. UI definition 324A may define user interfaces of a widget for application 312A at respective times. UI definition 324A may be provided in a declarative syntax, for example by providing a user interface definition declaratively with respect to a current time, which can then be interpreted to determine user interface definitions for future times. The user interface elements in UI definition 324A may be defined in a tree or view hierarchy, wherein each node in the tree represents a particular user interface element. By rendering the entire view hierarchy, a complete user interface may be provided. Thus, an array of view hierarchies can be provided to define user interfaces associated with respective future times.

As shown in FIG. 3, the UI definition 324A may query data extension 314A to retrieve data to be shown by the corresponding widget. For example, data extension 314A may provide user calendar entries previously entered into application 312A. Data 326A may include asset resources and placeholder content when, for example, data extension 314A is unavailable or is too costly to invoke, such as when a widget update budget is exceeded. For example, the placeholder content may correspond to an icon of the application. The placeholder content may also include sample offline data to be shown in a live preview when adding a new widget. Config 328A may include configuration items that may include user adjustable settings such as widget size, widget type, and widget parameters. Container 322B and container 322C may contain elements similar to container 322A but for respective applications 312B and 312C.

Note that data extensions 314A-314C are separate from their respective applications 312A-312C. Accordingly, timeline renderer 352 can request dynamic data to be shown in widget user interfaces from data extensions 314A-314C. rather than querying applications 312A-312C directly. Thus, computationally expensive launching and querying of applications 312A-312C can be minimized, thereby providing a more efficient rendering. For example, when the applications 312A-312C are previously active, they may update a respective shared database or flat file that is accessible to data extensions 314A-314C, wherein the shared database or flat file contains dynamic data that is likely to be used in future widget user interface renderings by timeline renderer 352.

In this manner, data extensions 314A-314C may minimize waking of the associated applications 312A-312C for improved computational efficiency. However, if the dynamic data necessary for rendering is unavailable in data extensions 314A-314C, then a waking of the associated application 312A-312C may be initiated if permitted by policy manager 354, for example if compliant with application update budgets. Further, if the associated application 312A-

312C is already executing in the background, then the data extensions 314A-314C may opportunistically query the already executing application 312A-312C to update the shared database or flat file with new dynamic data, since the query does not trigger a computationally expensive wake or launch operation.

Policy manager 354 may determine when to update timelines 330 according to various update policies. Each widget in containers 322A-322C may request rendered views to be provided according to an update schedule, which may define, for example, desired update frequency, desired update time windows, and desired earliest start date and time for rendering. Policy manager 354 may attempt to service the update schedules for all widgets on a best effort basis while enforcing update budgets.

For example, in some implementations, each widget may be provided with a fixed periodic update budget that is periodically reset, for example a budget of 50 updates that is reset daily. A normal rendering of a view according to a requested update schedule may consume a single update, whereas receiving a push notification, for example from push notification server 116, to render a new view may consume two updates. For example, when a new sports score is available, a score update may be pushed to data extension 314B via push notification server 116, which may have previously received the score update via a third party provider server associated with application 312B. Applications with largely static and predictable updates such as application 312A for calendar and application 312C for weather can request high frequency update schedules, as shown by the three rendered views 332A-332C for application 312A and 332E-332G for application 312C. Applications with less predictable updates such as application 312B for sports scores may request low frequency update schedules, as shown by the single rendered view 332D, thereby reserving update budget for push notifications. When a widget exhausts its update budget, the widget may continue showing the last rendered view, or placeholder content such as an application icon may be shown in place of future updates.

Since the updates may be provided on a best effort basis, policy manager 354 may use one or more policies to override or adjust the requested update schedules. For example, one policy may prioritize render updates for executing during idle time periods to avoid impacts to interface responsiveness and improve power management, such as when electronic device 102 is about to enter into a standby mode. Another policy may prioritize coalescing updates from multiple widgets to minimize updating overhead. Another policy may prioritize updates to widgets with a higher probability to be displayed, such as widgets placed on the leftmost home screen pages or widgets placed higher on a widget stack, as described further below. To accommodate the various policies for efficient rendering, policy manager 354 may defer or adjust the timing of the requested scheduled updates for widgets 320.

In this manner, policy manager 354 may use timeline renderer 352 to efficiently render widget user interfaces in advance of displaying. This enables electronic device 102 to minimize on-demand rendering of widget user interfaces immediately prior to display, which may introduce high latency and inefficient use of available processing resources. Further, since the widget user interfaces may be defined in containers using a unified and standardized format, management and development of widget user interfaces is highly facilitated as developers do not need to develop a bespoke widget for each application.

Policy manager 354 may invoke timeline renderer 352 to render one or more rendered views into timelines 330 in accordance with requested widget update schedules, widget update budgets, and update policies, as discussed above. For example, a specific number of view hierarchies may be traversed and rendered to provide a corresponding number of rendered views. In the example shown in FIG. 3, three view hierarchies are rendered for each of UI definition 324A and 324C, whereas one view hierarchy is rendered for UI definition 324B. Timeline renderer 352 may accordingly render one or more rendered views of widget user interfaces for associated future timestamps, which may also define time ranges. For example, referring to container 322A, timeline renderer 352 may use UI definition 324A and data 326A, which may query data extension 314A using config 328A, to generate the rendered view 332A corresponding to time $T_1$, the rendered view 332B corresponding to time $T_2$, and the rendered view 332C corresponding to time $T_3$. Similarly, timeline renderer 352 may generate rendered view 332D for container 322B and rendered views 332E-332G for container 322C.

Times $T_1$, $T_2$, and $T_3$ may correspond to successive future timestamps after the rendering. In some implementations, the associated timestamp for each rendered view may correspond to a earliest valid time range. Thus, rendered view 332A may be valid from time $T_1$ up until time $T_2$, at which point rendered view 332A may no longer be valid since rendered view 332B is available. Rendered view 332B may be valid from time $T_2$ up until time $T_3$, and rendered view 332C may be valid from time $T_3$ onwards until a new rendered view with a newer timestamp is available. When rendered views expire and are no longer valid for a current time, the expired rendered views may be marked for removal from timelines 330, for example by a garbage collection process.

Home screen manager 350 may be part of an operating system of electronic device 102, and may manage presentation of home screens and user interaction with home screens. Accordingly, home screen manager 350 may determine whether a particular container 332A-332C is displayed on a currently displayed home screen, and if so, further determine a particular rendered view from timelines 330 to show in the container based on the current time, as described in further detail below in FIG. 6. If a rendered view that is valid for the current time is unavailable, then the latest rendered view may be shown, or placeholder content may be shown, or a new rendered view may be generated on demand if the rendering is approved by policy manager 354.

Figure 4A:
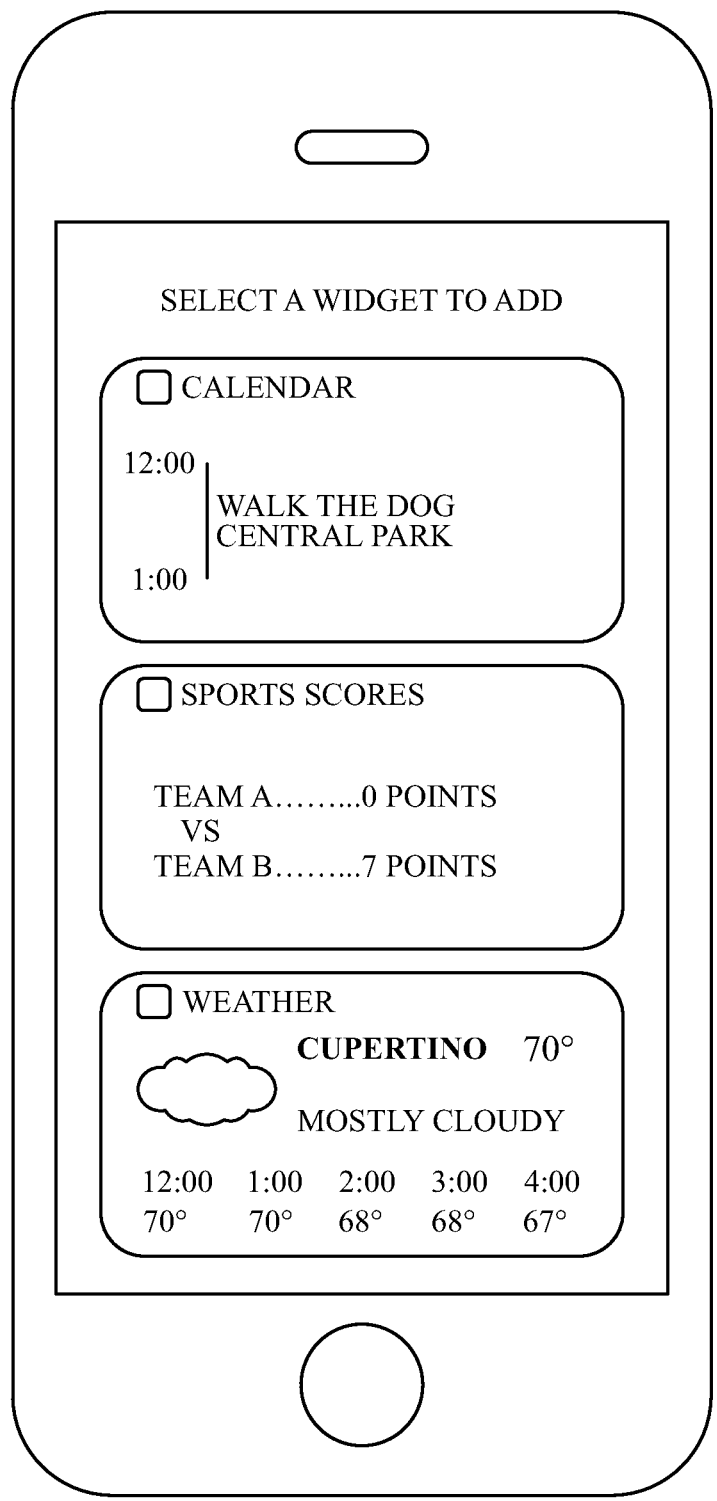
FIG. 4A illustrates an example user interface for adding a widget user interface to a home screen, in accordance with one or more implementations.

FIG. 4A illustrates an example user interface for adding a widget user interface to a home screen, in accordance with one or more implementations. As shown in FIG. 4A, the user interface may display a list of selectable widget user interfaces for adding to a home screen. For example, the list of installed applications, or applications 310, may be scanned and corresponding available widget user interfaces from application store server 114 may be displayed. In some implementations, the list of available widgets may be cached locally by electronic device 102 in advance.

The displayed widget user interfaces may correspond to live views, wherein the illustrated user interface is the same user interface shown during usage. However, when processing a large number of widgets at once, querying the associated data extensions, e.g. data extensions 314A-314C, to retrieve actual live data may require too much processing time. Further, access to the network 112 may be unavailable, in which case the data extensions 314A-314C may be unable to provide data from external data sources. Accordingly, as discussed above, sample offline data from data 326A-326C may be used as example data that is suitable for illustrating the appearance of each widget in live views to avoid querying of data extensions 314A-314C.

Figure 4B:
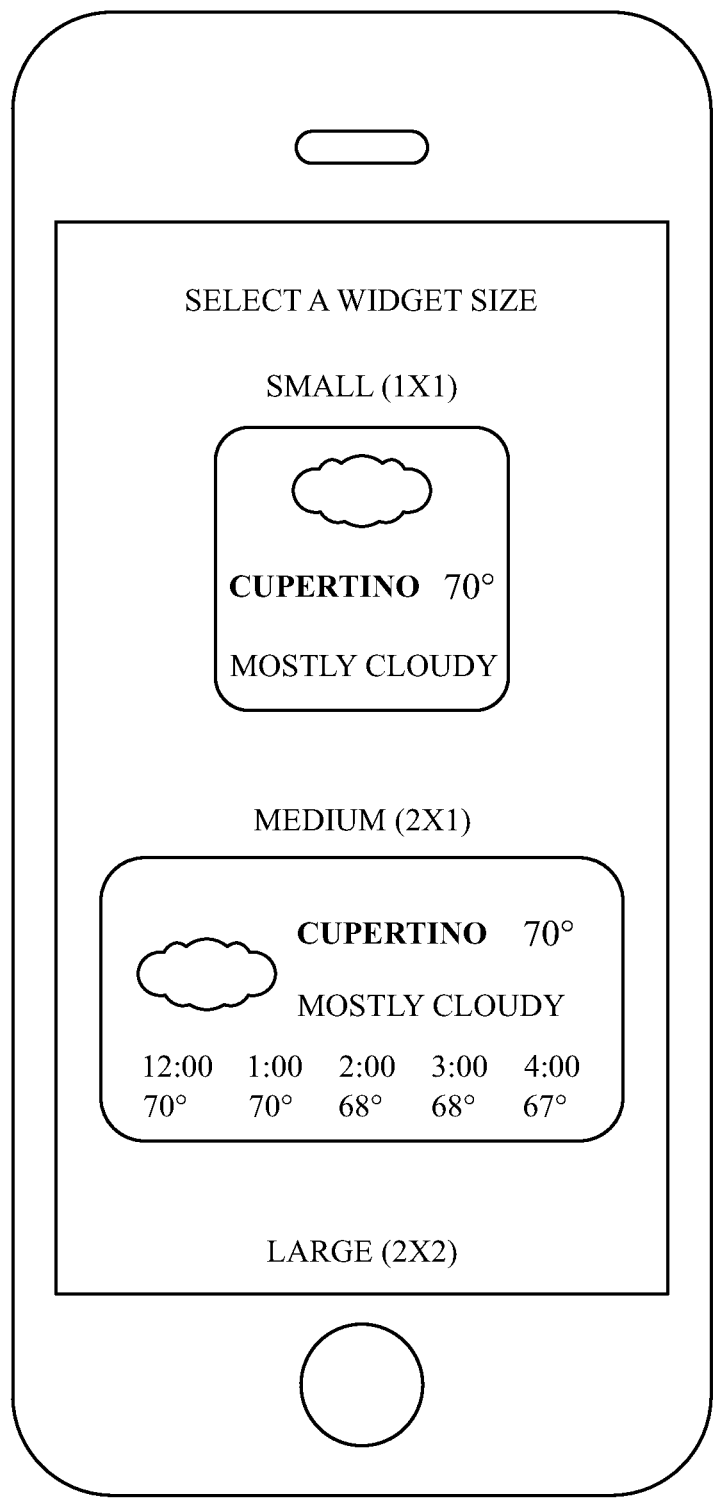
FIG. 4B illustrates an example user interface for customizing a widget user interface for adding to a home screen, in accordance with one or more implementations.

FIG. 4B illustrates an example user interface for customizing a widget user interface for adding to a home screen, in accordance with one or more implementations. For example, if the user selects the weather application widget corresponding to container 322C, then the user may be provided with various user interfaces to adjust properties and parameters in config 328C. One of the user adjustable properties may be a widget size, wherein the user can select from small (1×1), medium (2×1), or large (2×2). These sizes may, for example, correspond to a X by Y grid of icons that would be used on a home screen. As shown in FIG. 4B, the different sizes may show different levels of information, such as where the medium size widget further includes hourly weather predictions in addition to all the information shown in the small size widget. These differences may be stored as part of the corresponding UI definition 324C. If no differences are defined according to size, then the UI layouts may simply be scaled and/or reflowed to fit each corresponding widget size.

Another user adjustable property may include widget type, such as a detailed view for a specific item of interest, such as weather for a particular city, versus a general view, such as weather for several cities. Yet another user adjustable user property may include widget parameters, which may correspond to user adjustable preferences and parameters for the associated application. Selection data for the widget parameters may be retrieved from the associated data extension. For example, in the context of the weather widget or container 322C, data extension 314C may be queried for selectable cities to display weather, which may be selectable using, for example, a text search entry box and/or a drop down selector menu. Thus, by adjusting the widget parameters in this manner, the user may also add multiple instances of the same widget with different parameters, for example to track detailed weather from different cities. Each widget that is added and configured may be stored in a respective container within widgets 320. Further, home screen manager 350 may also maintain the home screen positioning for each container within widgets 320.

Figure 5:
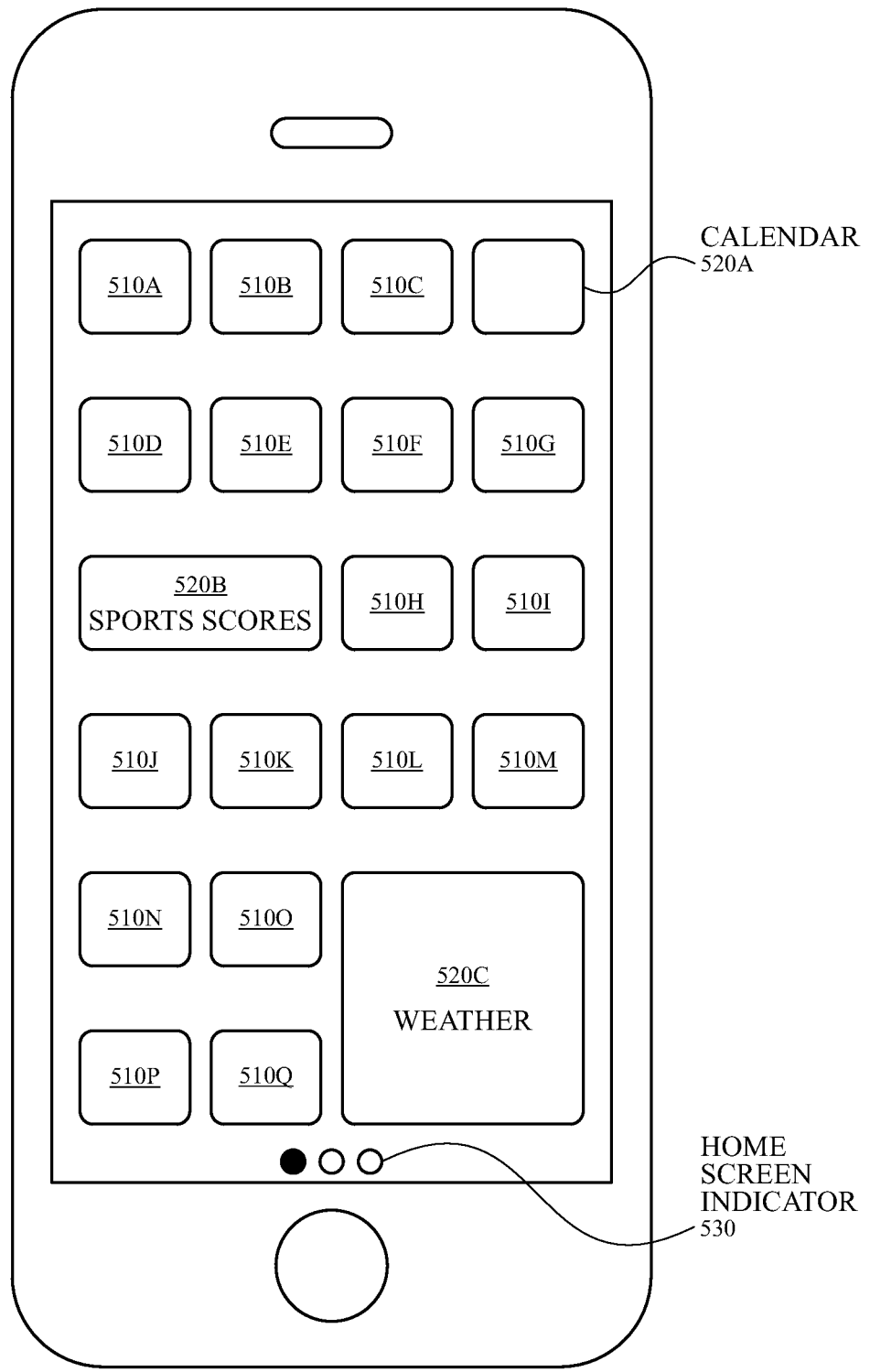
FIG. 5 illustrates an example home screen user interface displaying widget user interfaces, in accordance with one or more implementations.

FIG. 5 illustrates an example home screen user interface displaying widget user interfaces, in accordance with one or more implementations. As shown in FIG. 5, application shortcuts 510A through 510Q are shown in a grid, which may correspond to application icons for launching an associated installed application. Further, placed in the same grid are widget containers 520A, 520B, and 520C, corresponding to respective containers 322A, 322B, and 322C. Thus, home screens are enabled to display both application shortcuts and widget user interfaces in the same layout, rather than being limited to application shortcuts. Home screen manager 350 may support this functionality by storing lists of containers for each home screen that can correspond to application shortcuts, widget containers, or other arbitrary content. As shown by home screen indicator 530, the first or left-most home screen is displayed, wherein the user has configured three home screens.

As shown in FIG. 5, the widget containers can be various sizes, wherein widget container 520A is a small 1×1 size, widget container 520B is a medium 2×1 size, and widget container 520C is a large 2×2 size. These sizes are exemplary and any arbitrary size may be supported. In some implementations, home screen manager 350 may prevent larger sized containers from being displaced by smaller sized containers when moving and adjusting container positions. For example, moving widget container 520B cannot displace the position of widget container 520C. In this case, the user should first move container 520C if the user intends to move widget container 520B to the lower right position of the home screen.

Further, in some implementations, home screen manager 350 may support stacking of multiple widget containers. For example, when multiple widget containers are defined to be at the same position, then home screen manager 350 may treat the multiple widget containers as a stack. Home screen manager 350 may further restrict widget stacks to be containers of the same widget size. The user may change the top-most displayed widget container by, for example, providing a swipe up or swipe down gesture, which may trigger an animation that flips through the different widget containers of the stack. As discussed above, policy manager 354 may prioritize updates of widgets that are more likely to be displayed according to home screen location, which may include whether the widget container is closer to the top of a widget stack, and whether the widget container is placed closer to a first or leftmost home screen.

Besides displaying the widget user interfaces, home screen manager 350 may also support interaction with the widget user interfaces. For example, portions of the widget user interfaces may be defined to launch into a corresponding section of the associated application in response to a user interaction. Referring back to FIG. 4A for example, the user may touch on the upper area labelled "Team A" in the Sports Scores widget to find more sports scores associated with "Team A", or may touch the lower area labelled "Team B" in the Sports Scores widget to find more sports scores associated with "Team B". The interactive regions of the user interfaces may be defined in UI definition 324B to access a respective Universal Resource Indicator (URI), which may launch into an associated portion of application 312B, or score histories for respective "Team A" and "Team B".

Figure 6:
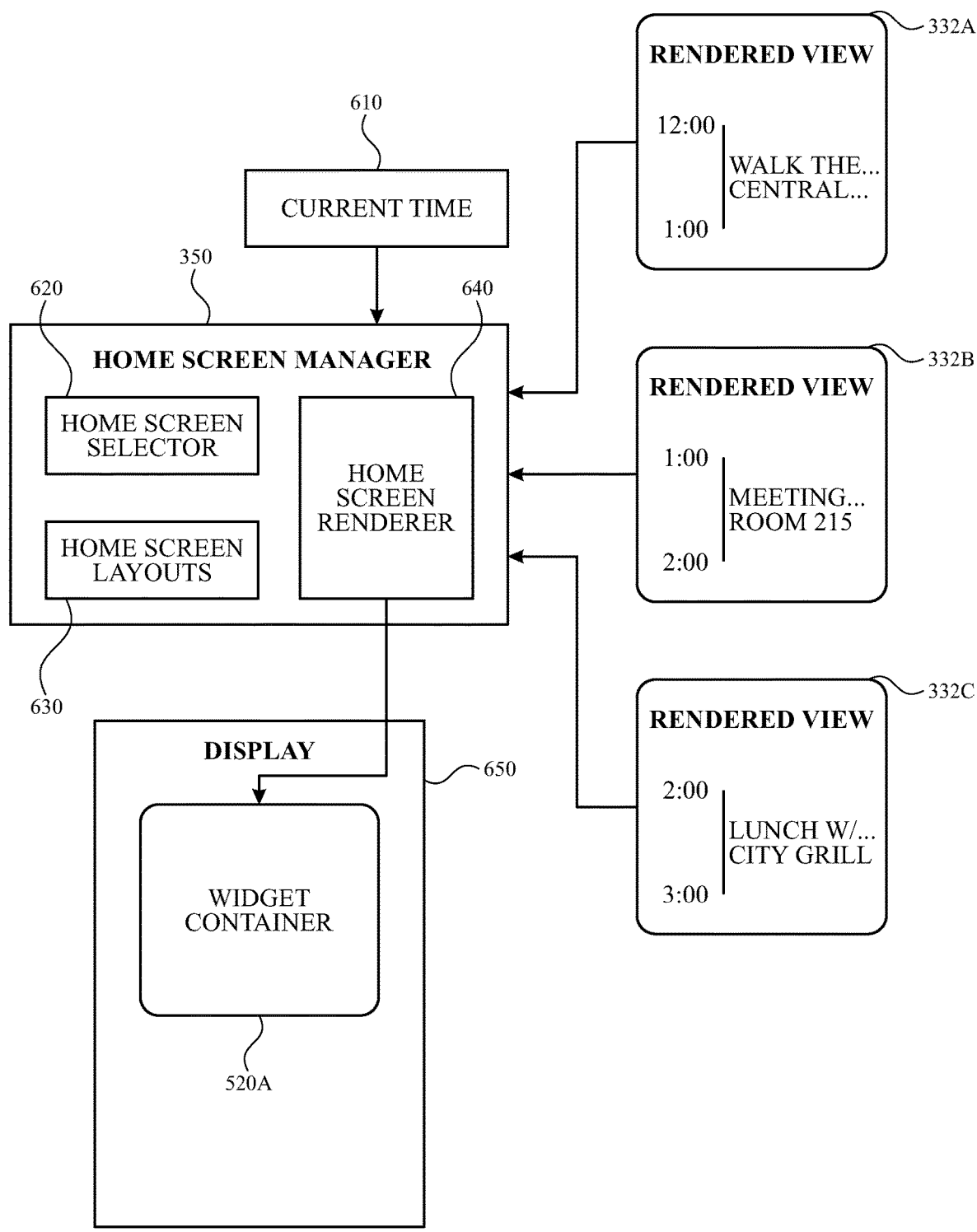
FIG. 6 illustrates a block diagram for selecting a rendered user interface for display in a widget container, in accordance with one or more implementations.

FIG. 6 illustrates a block diagram for selecting a rendered user interface for display in a widget container, in accordance with one or more implementations. Home screen manager 350 may determine that widget container 520A is currently displayed on display 650, for example by determining that home screen selector 620 has selected the first or leftmost home screen for display, corresponding to home screen indicator 530 in FIG. 5, and that widget container 520A is displayed on the first home screen, for example by referencing home screen layouts 630, which may contain lists of containers for each home screen, as discussed above.

Home screen manager 350 may then determine the current time 610 and select a rendered view from rendered views 332A-332C that corresponds to the current time 610. For example, rendered views 332A-332C may have been previously generated at 4:00 AM, and it may be preferable to show the calendar entry for the next calendar event at least 30 minutes in advance. In this case, rendered view 332A may correspond to time $T_1$ at 4:01 AM, rendered view 332B may correspond to time $T_2$ at 12:30 PM, and rendered view 332C may correspond to time $T_3$ at 1:30 PM. Based on the current time 610, a rendered view may be selected accordingly. For example, if the current time 610 indicates 11:00 PM, then rendered view 332A may be selected. If the current time 610 indicates 1:40 PM, then rendered view 332C may be selected. Thus, the rendered view with the latest timestamp that is still valid for the current time 610 may be preferred for selection. As discussed above, the timestamps for each rendered view may define an earliest valid time range.

Once a rendered view is selected, then home screen renderer 640 may display the selected rendered view in widget container 520A when rendering the selected home screen according to home screen selector 620, which may select a home screen according to user input, for example left and right swipe inputs. For example, if home screen manager 350 selects rendered view 332C, then rendered view 332C may be shown within widget container 520A. While display 650 only indicates widget container 520A for simplicity, it should be understood that display 650 may also include other containers indicated in home screen layouts 630 to display an interface as shown in FIG. 5.

In some embodiments, the rendered views may be an intermediate representation that can be quickly rendered by home screen renderer 640 to dynamically adjust to various user interface properties, such as theme colors, fonts, transparency, and other properties without requiring a new rendering of the rendered views. The user interface properties may, for example, be inherited from global user interface settings that may be adjustable by the user.

Figure 7:
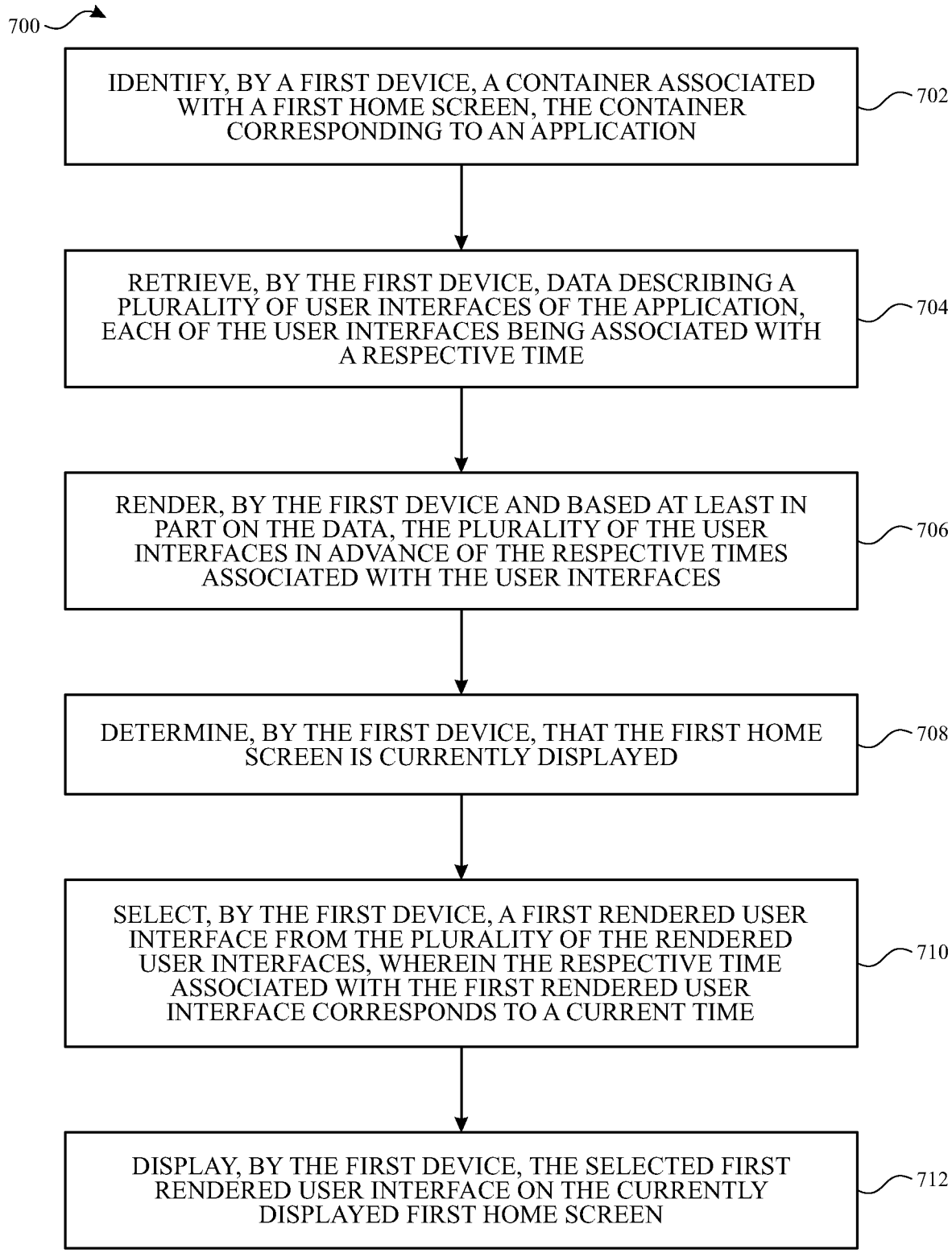
FIG. 7 illustrates a flow diagram of an example process for providing efficient rendering of widget user interfaces for display of dynamic application content on a home screen, in accordance with one or more implementations.

FIG. 7 illustrates a flow diagram of an example process 700 including blocks 702, 704, 706, 708, 710, and 712 for providing efficient rendering of widget user interfaces for display of dynamic application content on a home screen, in accordance with one or more implementations. For explanatory purposes, the process 700 is primarily described herein with reference to the electronic devices 102, 104, 106, 108 and 110 of FIG. 1. However, the process 700 is not limited to the electronic devices 102, 104, 106, 108 and 110, and one or more blocks (or operations) of the process 700 may be performed by one or more other components and/or other suitable devices. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

The electronic device 102 identifies a container associated with a first home screen, the container corresponding to an application (702). Referring to FIG. 3 and FIG. 6, this may correspond to electronic device 102 identifying a container 322A associated with a leftmost home screen in home screen layouts 630, wherein the container 322A corresponds to application 312A.

The electronic device 102 retrieves data describing a plurality of user interfaces of the application, each of the user interfaces being associated with a respective time (704). Referring to FIG. 3, this may correspond to electronic device 102 retrieving UI definition 324A describing a rendered view 332A, 332B, and 332C of application 312A associated with respective times $T_1$, $T_2$, and $T_3$. As discussed above, UI definition 324A may define the user interfaces in a declarative syntax, for example by defining a widget user interface with respect to a current time to allow widget user interfaces to be interpreted for future times. Further, the UI definition 324A may be structured as an array of view hierarchies, wherein nodes of the view hierarchies correspond to individual UI elements, and array indexes correspond to respective times. The UI definition 324A may reference an extension associated with application 312A, or data extension 314A, to obtain dynamic data for display in the rendered views 332A-332C.

The electronic device 102 renders, based at least in part on the data, a plurality of the user interfaces in advance of the respective times associated with the user interfaces (706). Referring to FIG. 3, this may correspond to timeline renderer 352 rendering, based at least on UI definition 324A, the rendered views 332A, 332B, and 332C in advance of the associated respective times $T_1$ (4:01 AM), $T_2$ (12:30 PM), and $T_3$ (1:30 PM). For example, as discussed above, policy manager 354 may determine a time for rendering the rendered views 332A-332C according to requested update schedules, update budgets, power management, and other factors. For example, the determined time may correspond to 4:00 am, wherein the electronic device 102 is in an idle state.

The electronic device 102 determines that the first home screen is currently displayed (708). Referring to FIG. 6, this may correspond to home screen selector 620 selecting the leftmost home screen, which results in a user interface corresponding to FIG. 5 to be displayed on display 650.

The electronic device 102 selects a first rendered user interface from the plurality of the rendered user interfaces, wherein the respective time associated with the first rendered user interface corresponds to a current time (710). Referring to FIG. 6, this may correspond to home screen renderer 640 selecting from rendered view 332A, 332B, or 332C, wherein the respective time $T_1$ (4:01 AM), $T_2$ (12:30 PM), or $T_3$ (1:30 PM) corresponds to the current time 610. As discussed above, this may be determined by using the timestamps of the rendered views 332A-332C as defining an earliest valid time range, wherein the most recent rendered view that is still valid for current time 610 is preferred for selection.

The electronic device 102 displays the selected first rendered user interface on the currently displayed first home screen (712). Referring to FIG. 6, this may correspond to home screen renderer 640 displaying the selected rendered view 332A, 332B, or 332C in the widget container 520A on the currently displayed leftmost home screen on display 650. The resulting rendering of display 650 may appear similar to FIG. 5.

As described above, one aspect of the present technology is the gathering and use of data available from specific and legitimate sources for displaying widget user interfaces. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for recognizing a spoken command. Accordingly, use of such personal information data may facilitate transactions (e.g., on-line transactions). Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of outputting media content, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 8:
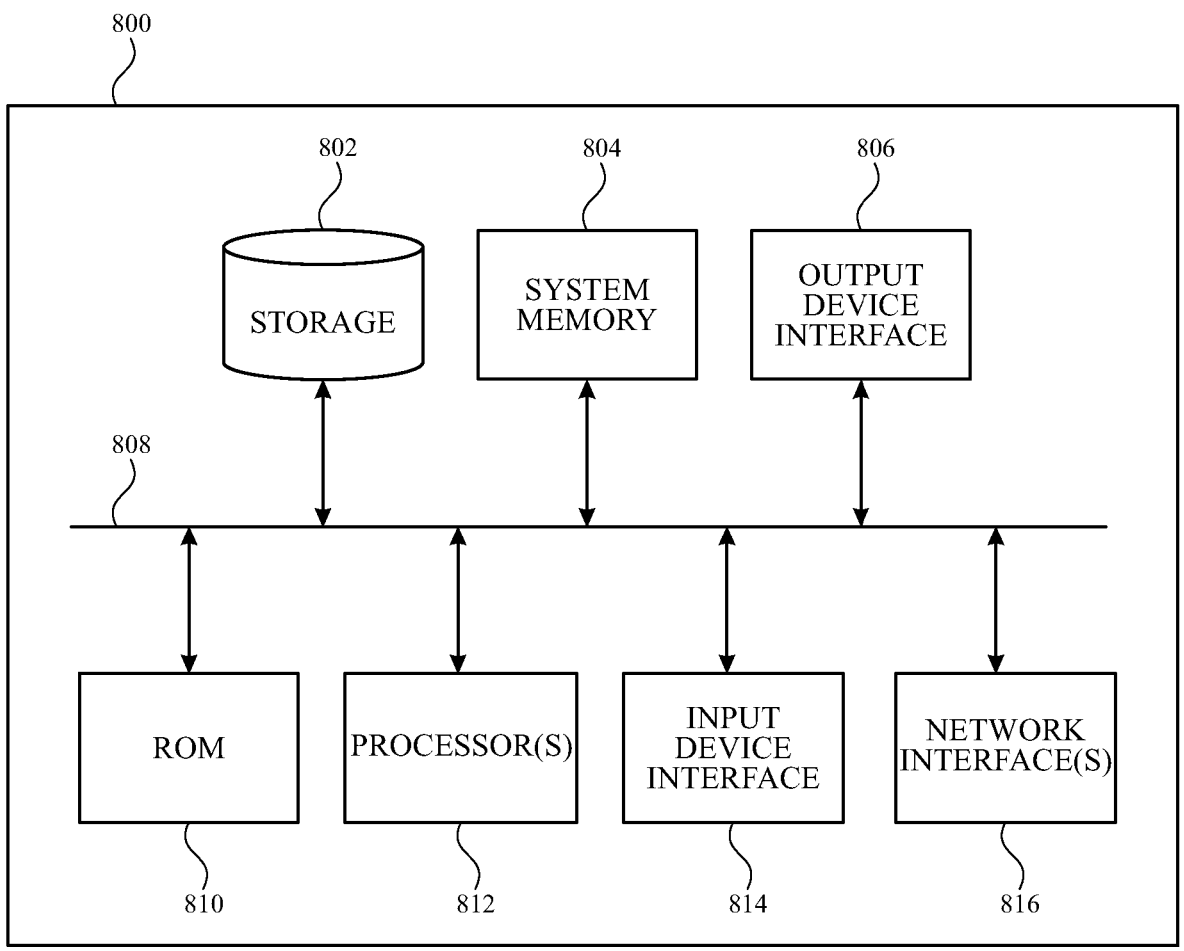
FIG. 8 illustrates an example electronic system with which aspects of the subject technology may be implemented in accordance with one or more implementations.

FIG. 8 illustrates an electronic system 800 with which one or more implementations of the subject technology may be implemented. The electronic system 800 can be, and/or can be a part of, one or more of the electronic devices 102-110, and/or one or the servers 114-118 shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as one or more of the servers 114-118 shown in FIG. 1, through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations.

Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   identifying, by a first device, a container associated with a first home screen, the container corresponding to an application;
   retrieving, by the first device, data describing a plurality of user interfaces of the application, each of the user interfaces being associated with a different respective pre-determined display time value;
   determining, based at least in part on one or more factors in addition to the different respective pre-determined display time values, a time to render each user interface of the plurality of user interfaces in advance of the different pre-determined display time values;
   rendering, by the first device and based at least in part on the data, the plurality of the user interfaces of the application at the determined time in advance of the different respective pre-determined display time values associated with the user interfaces;
   determining, by the first device, that the first home screen is currently displayed;
   selecting, by the first device, a first rendered user interface from the plurality of the rendered user interfaces, wherein the respective pre-determined display time value associated with the first rendered user interface corresponds to a current time; and
   displaying, by the first device, the selected first rendered user interface on the currently displayed first home screen.

2. The method of claim 1, wherein the data comprises view hierarchies.

3. The method of claim 1, wherein the data uses a declarative syntax.

4. The method of claim 1, wherein the data references an extension of the application that is separate from the application.

5. The method of claim 4, wherein the data defines one or more parameters for the extension of the application.

6. The method of claim 4, wherein the data contains sample data content to substitute for references to the extension of the application.

7. The method of claim 6, wherein the sample data content is utilized to provide a live view of the user interfaces prior to associating the container with the first home screen.

8. The method of claim 1, wherein the data defines interactive portions of the user interfaces, and further comprising receiving a user input for one of the interactive portions of the user interfaces to launch into an associated portion of the application.

9. The method of claim 1, wherein the container is identified from a list of containers that defines an arrangement of the first home screen.

10. The method of claim 1, wherein the rendering is based on an update policy.

11. The method of claim 10, wherein the update policy is based on at least one of a periodic update budget for the application or a position of the first home screen.

12. The method of claim 10, wherein the update policy is based on an update schedule requested in the data by an extension of the application that executes separately from the application.

13. The method of claim 10, wherein the update policy is based on coalescing updates for a plurality of containers.

14. The method of claim 10, wherein the update policy is based on power management of the first device.

15. The method of claim 1, wherein the one or more factors comprise: an update schedule requested for the container, an update budget of the container, or a power management factor.

16. A device, comprising:
   a memory; and
   at least one processor configured to:
      identify a widget associated with a first home screen, the widget corresponding to an application;
      retrieve data describing a plurality of user interfaces of the widget, each of the user interfaces being associated with a different respective pre-determined display times;
      determine, based at least in part on one or more factors in addition to the different pre-determined display times, a time to render each user interface of the plurality of user interfaces in advance of the different pre-determined display times;

render, based at least in part on the data, each user interface of the plurality of the user interfaces of the widget at the determined time in advance of the respective pre-determined display times associated with the user interfaces;

determine that the first home screen is currently displayed;

select a first rendered user interface from the plurality of the rendered user interfaces, wherein the respective pre-determined display time associated with the first rendered user interface corresponds to a current time; and display the selected first rendered user interface on the currently displayed first home screen.

17. The device of claim 16, wherein the data comprises view hierarchies using a declarative syntax.

18. The device of claim 16, wherein the processor is configured to retrieve the data describing the plurality of the user interfaces of the widget from an extension of the application that corresponds to the widget and is separate from the application.

19. The device of claim 16, wherein the processor is configured to render the plurality of the user interfaces based on an update policy that uses at least one of: a periodic update budget for the widget, a position of the first home screen, an update schedule defined in the data, coalescing updates for a plurality of containers, and power management.

20. A non-transitory machine-readable medium storing instructions that, when executed by one or more processors, cause the one or more processors to:

identify, by an operating system, a widget associated with a first home screen, the widget corresponding to an application that is separate from the operating system;

retrieve, by the operating system, data describing a plurality of user interfaces of the application, each of the user interfaces being associated with a respective display time;

determine, by the operating system and based at least in part on one or more factors that are separate from the respective display times, a respective time to render each of the plurality of user interfaces in advance of the respective display times;

render, by the operating system and based at least in part on the data, each user interface of the plurality of the user interfaces of the application at the determined respective time in advance of the respective display times associated with the user interfaces;

determine, by the operating system, that the first home screen is currently displayed;

select, by the operating system, a first rendered user interface from the plurality of the rendered user interfaces, wherein the respective display time associated with the first rendered user interface corresponds to a current time; and display, by the operating system, the selected first rendered user interface on the currently displayed first home screen.

* * * * *